United States Patent [19]

Schnizler, Jr.

[11] 3,964,332

[45] June 22, 1976

[54] DRIVER FOR NUTS AND SCREWS

[75] Inventor: Albrecht Schnizler, Jr., Nurtingen, Germany

[73] Assignee: Metawerke KG Closs, Rauch & Schnizler, Nurtingen, Germany

[22] Filed: Jan. 17, 1975

[21] Appl. No.: 541,331

[30] Foreign Application Priority Data

Jan. 17, 1974 Germany............................ 2402099

[52] U.S. Cl....................................... 74/325; 74/333

[51] Int. Cl.[2]............................................ F16H 3/08

[58] Field of Search............................... 74/333, 325

[56] References Cited

UNITED STATES PATENTS 3,029,658 4/1962 Dassance.......................... 74/333 X

*Primary Examiner*—Leonard H. Gerin

*Attorney, Agent, or Firm*—Michael J. Striker

[57] ABSTRACT

An output shaft is rotatably journalled in a housing, as is a motor, and motion is transmitted from the motor to the output shaft via a variable gear transmission which has at least two selectable gear ratios.

12 Claims, 3 Drawing Figures

DRIVER FOR NUTS AND SCREWS

BACKGROUND OF THE INVENTION

The present invention relates generally to a power tool, and more particularly to a driver for nuts, bolts, screws and the like.

Particularly the construction industry utilizes more and more self-tapping screws which have a relatively small diameter and are formed with a pointed tip, or have a larger diameter and are formed with a cutting edge analogous to the edge found on drill bits. Such screws are used for making connections in soft material, such as wood, synthetic plastic or on sheet rock that is placed over a metallic base. The advantage of using such screws is that several previously necessary operating steps are combined in a single one, since the screw drills its own hole and in the same operating step is also threaded into the hole. The use of such screws is time saving and, therefore, labor saving and aids in cutting of construction expenses, especially where large projects are involved.

Special power tools have been developed for use with such screws, usually electrically powered power tools having a pistol grip and using a simple claw-type coupling having a forward claw ring which is connected with the tool holder or screw holder, and which when the tool is placed against the screw and the latter is pressed against the workpiece, is shifted axially against the force of a spring and brought into engagement with a second claw ring that is driven by the motor. Once the screw has been driven in, a slight release of the pressure exerted upon the tool in the direction towards the workpiece, is sufficient to bring the two claw rings out of engagement in order to thereby interrupt further transmission of motion to the shaft which turns the screw-engaging component of the tool.

Generally speaking, this type of equipment has been found to be highly advantageous in the construction industry and is widely used. However, the currently used self-tapping screws range in diameter from approximately 2.9 - 6.3 mm, that is they have a quite wide diameter range. For this wide range it is difficult to determine an optimum rotational speed for the tool, since the smaller-diameter type screws, which are very widely used, permit a high rotational speed which is desired for reasons of economy. Larger-diameter self-tapping screws, however, frequently require a higher torque than it is possible to deliver at the higher rotational speed.

SUMMARY OF THE INVENTION

Accordingly, it is a general object of the present invention to overcome the disadvantages of the prior art.

More particularly, it is an object of this invention to provide an improved power tool in form of a driver for screws, nuts, bolts and the like, which avoids the aforementioned disadvantages.

Still more particularly, it is an object of this invention to provide such an improved power tool which permits the rapid and reliable threading-in and also threading-out of screws, nuts and the like having either relatively large or relatively small diameters.

In keeping with these objects, and others which will become apparent hereafter, one feature of the invention resides in a power nut and screw driver which, briefly stated, comprises a housing, an output shaft rotatably journalled in the housing, a motor, and means for transmitting motion from the motor to the output shaft. This means includes a variable gear transmission having at least two selectable gear ratios. It is now possible to use the gear ratio producing a slower rotational speed for the manipulation of screws of larger diameter where higher torque is required, and to use the gear ratio producing the higher rotational speed for manipulation of screws and the like having a smaller diameter and requiring less torque.

It is advantageous if the gear drive comprises a pinion shaft having two pinions and a further shaft on which a selector gear is actually slidable into selective engagement with one or the other of the pinions. The construction is particularly simple if the selector shaft is slidable on the drive shaft which holds and turns the screw or nut-engaging component of the tool. It is also advantageous if a bifurcated member engages the selector gear in a circumferential groove of the later, and if the bifurcated member and therefore the selector gear can be shifted by a handle that is accessible from the exterior of the housing of the tool, for example in that the bifurcated member is provided with a rack which engages with teeth of the handle. The bifurcated member and the rack may advantageously be of one with another which is a particularly simple expedient. The housing can be provided with a guide pin which guides the bifurcated member during the movements thereof.

The use of the tool is particularly simplified if the housing is provided with a step wherein the handle is mounted, so that undesired operation of the handle, or an engaging of the handle on some obstacle, are largely avoided.

A particularly simple and compact construction is obtained if the teeth on the gear are constructed as a pinion having a shoulder which engages the housing, and an engaging portion which is located at the exterior of the housing. The handle may be provided with a snap detent arrangement which engages with at least one recess in the housing, to prevent undesired displacement of the handle.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
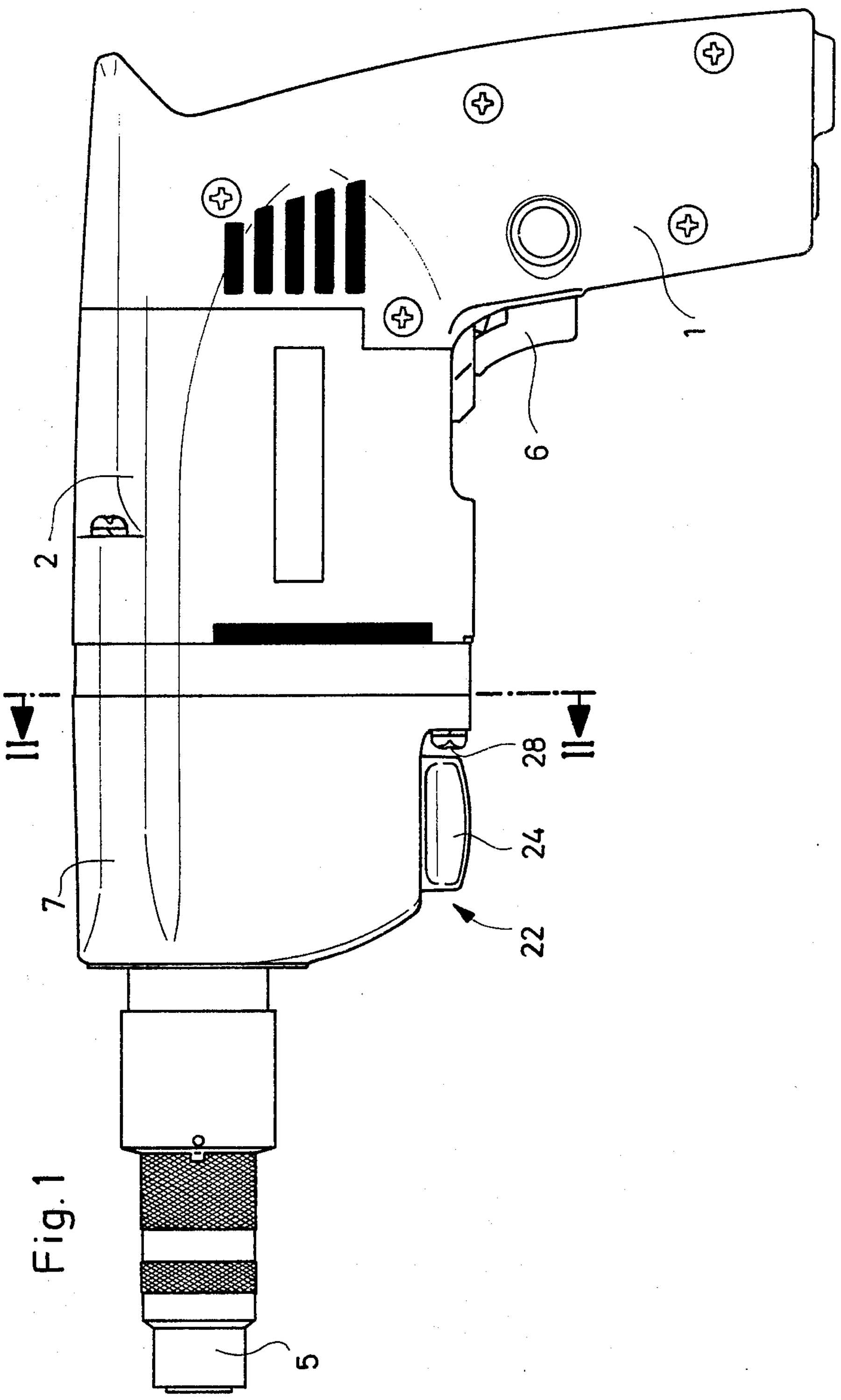
FIG. 1 is a somewhat diagrammatic side view of a tool according to the present invention.
Figure 3:
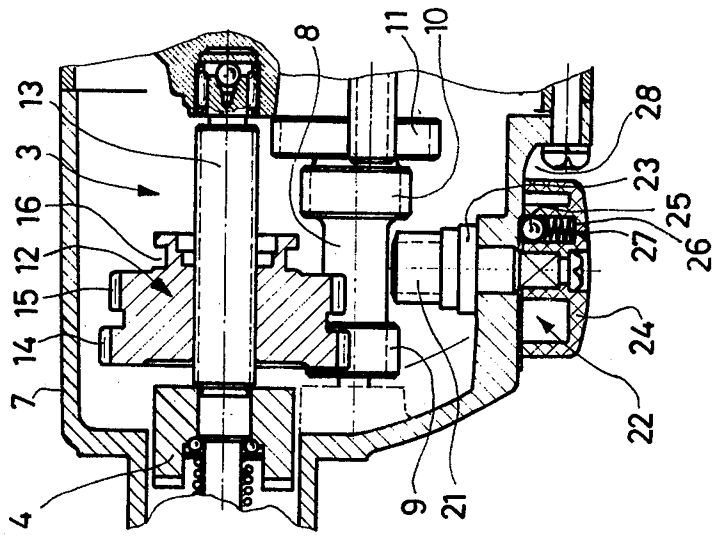
FIG. 3 is a section on line III—III of FIG. 2.
Figure 2:
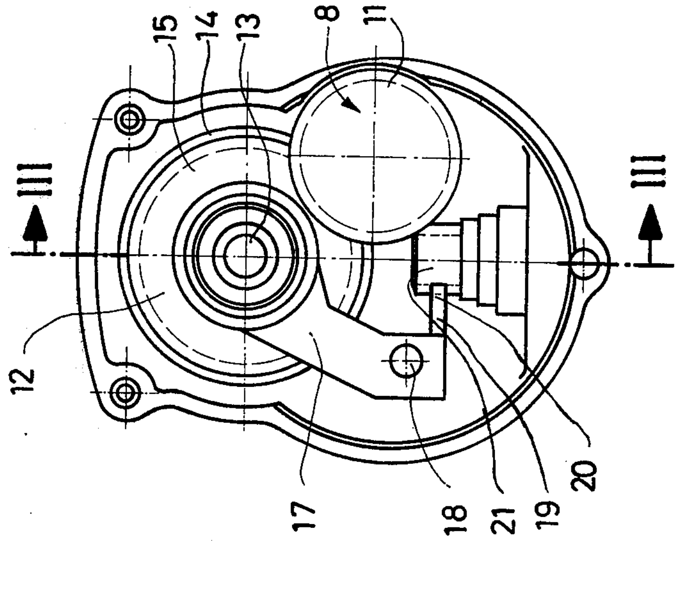
FIG. 2 is a section in diagrammatic form, taken on line II—II of FIG. 1.

Referring to the drawing in detail, wherein FIGS. 1–3 illustrate a single exemplary embodiment of the invention, it will be noted that the tool in toto is shown in FIG. 1. It has a pistol grip 1 and a motor housing 2 in which the electromotor is accommodated. The motor drives a screw, nut or the like engaging member 5 via a coupling 4 and a variable gear drive 3 having two or more selectable gear ratios. A switch 6 serves to supply or interrupt power for the motor.

The gear drive 3 is mounted in a gear housing 7 and has a pinion shaft 8 provided with a first pinion 9 and a second pinion 10. It also has a motor-driven gear 11 and a shaft 13 which carries a selector gear 12 that can shift axially of the shaft 13 but can rotate only with but not relative to the shaft. The shaft also carries a coupling 4. The selector gear 12 is composed of two individual gears 14 and 15 of which, depending upon the positiion of the gear 12 on the shaft 13, either the gear 14 meshes with the pinion 9 or the gear 15 meshes with the pinion 10. Due to the differential diameters, different output rpm's of the shaft 13 are obtained, while the rotational speed of the motor remains unchanged.

The gear 12 is formed with a circumferential groove 16 into which a bifurcated member 17 engages that is mounted on a guide pin 18 which is fixedly mounted in the housing 7. The member 17 can shift lengthwise of the pin 18 and is formed with an angled portion 19 and with a rack 20 which meshes with a pinion 21 of a handle 22 that can be operated from the exterior of the tool. To form the handle 22 the pinion 21 is provided with a shoulder 23 which engages the gear housing 7. Located at the exterior of the gear housing 7 there is provided a handle portion or engaging portion 24 which is protected against undesired turning with a detent arrangement 27 composed of a ball 25 and a spring 26 which acts upon the ball 25. The housing 7 is provided with appropriate depressions into which the ball 25 can snap under the urging of the spring 26, in correspondence with the positions that can be selected for the engaging portion 24, which of course correspond to the positions of engagement that can be assumed by the gears 14 and 15. A further safety factor against undesired turning of the handle 22 is provided in that their engaging portion 24 is mounted in a step 28 of the housing 7 on the underside of the latter.

It is clear that by reversing the direction of rotation of the electric motor, the tool according to the present invention can also be used to unscrew nuts, bolts, screws or the like. Direction-reversible electric motors are too well known to require detailed description.

It will be understood that each of the elements described above, or two or more together, may also find a useful application in other types of constructions differing from the types described above.

While the invention has been illustrated and described as embodied in a driver for nuts, bolts, screws and the like, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A power nut and screw driver comprising: a housing; an output shaft rotatably journalled in said housing; a motor; means for transmitting motion from said motor to said output shaft, including a variable gear transmission having at least two selectable gear ratios, said gear transmission comprising a first shaft carrying two pinions and a second shaft extending along said first shaft, and a selector gear shiftable on said second shaft for selectively meshing with one or the other of said two pinions, said selector gear being formed with a circumferential groove; a bifurcated shifting member engaged at one end thereof in said groove; and a handle connected with said member and accessible outside said housing for effecting the axial shifting of said selector gear, said handle having a toothed portion, and said member having a rack portion which meshes with said toothed portion.

2. A power nut and screw driver as defined in claim 1, wherein a member projecting from said housing and formed to engage a nut or a screw is associated to said output shaft.

3. A power nut and screw driver as defined in claim 1, wherein said motor is a reversible electromotor and a switch is located on said housing, said switch being operable to cause rotation of said first shaft selectively in one or the other direction.

4. A power nut and screw driver as defined in claim 1, wherein the toothed portion of said handle is a pinion.

5. A driver as defined in claim 1, wherein said rack portion is of one piece with said member.

6. A driver as defined in claim 5, wherein said rack portion is angled with reference to the remainder of said member.

7. A driver as defined in claim 1, further comprising a gear housing for said variable gear; and a guide pin in said gear housing on which said member is guided for shifting movement.

8. A driver as defined in claim 7, wherein said gear housing is formed with a step, and said handle is located on said step.

9. A driver as defined in claim 1, wherein said toothed portions configurated on a pinion being a shoulder which engages said gear housing; and further comprising an engaging portion at the outside of said gear housing.

10. A driver as defined in claim 1, said gear housing having at least one recess proximal to said handle; and further comprising a snap-in detent on said handle and adapted to snap into said recess to retain the handle in a selected position.

11. A driver as defined in claim 10, wherein said detent comprises a spring-loaded ball detent.

12. A power nut and screw driver comprising: a housing; an output shaft rotatably journalled in said housing; a member at the end of said output shaft, said member projecting from said housing and being engageable with a nut or a screw; a reversible electromotor in said housing; means for transmitting from said electromotor to said output shaft rotational motion, including a variable gear transmission having at least two selectable gear ratios and operatively connected to said electromotor.

* * * * *